United States Patent [19]

Hemmerle et al.

[11] Patent Number: 4,524,504

[45] Date of Patent: Jun. 25, 1985

[54] METHOD OF REPLACING WORN AND/OR DAMAGED SURFACES

[76] Inventors: Clayton J. Hemmerle, 116 NE. 16th Ct., Ft. Lauderdale, Fla. 33305; Richard A. Basinger, 6318 SW. 26th St., Miramar, Fla. 33023

[21] Appl. No.: 531,647

[22] Filed: Sep. 13, 1983

Related U.S. Application Data

[62] Division of Ser. No. 352,102, Feb. 25, 1982, Pat. No. 4,438,800.

[51] Int. Cl.³ .......... B23P 11/02

[52] U.S. Cl. .......... 29/450; 29/453

[58] Field of Search .......... 29/450, 453; 108/153, 108/901; 160/371, 385, 383, 390, 402, 403, 404; 297/440, 441, 452, 457

[56] References Cited

U.S. PATENT DOCUMENTS

| | | | |
|---|---|---|---|
| 2,425,245 | 8/1947 | Johnson | 29/453 UX |
| 2,522,097 | 9/1950 | Cookson | 29/453 UX |
| 3,054,643 | 9/1962 | Militano | 297/440 |
| 3,061,374 | 10/1962 | Grosfillex | 297/440 |
| 3,205,008 | 9/1965 | Murray et al. | 297/440 X |
| 3,229,029 | 1/1966 | Weiss | 29/453 UX |
| 3,245,715 | 4/1966 | Gits | 297/440 X |
| 3,274,641 | 9/1966 | Lien | 29/453 X |
| 3,319,999 | 5/1967 | Lieberman et al. | |
| 3,393,941 | 7/1968 | Grosfillex | 297/440 |
| 3,471,200 | 10/1969 | Morrison | 297/441 |
| 3,512,834 | 5/1970 | Lockshin | 297/441 |
| 3,565,487 | 2/1971 | Reiter | |
| 3,737,926 | 6/1973 | Hermanson | |
| 4,119,286 | 10/1978 | Barrill | |
| 4,275,925 | 6/1981 | Harder, Jr. | |

*Primary Examiner*—Charlie T. Moon

*Attorney, Agent, or Firm*—Cushman, Darby & Cushman

[57] ABSTRACT

At least a portion of a worn and/or damaged surface can be replaced with slats of the type including opposing ends each having an attachment member biased into a normal substantially closed position and defining a cavity. A force in a direction opposing the bias force is applied to the attachment member so as to gain access to the cavity. Once the slat is positioned with respect to a support, the applied force is removed thereby allowing the attachment member to return to the normal substantially closed position.

5 Claims, 8 Drawing Figures

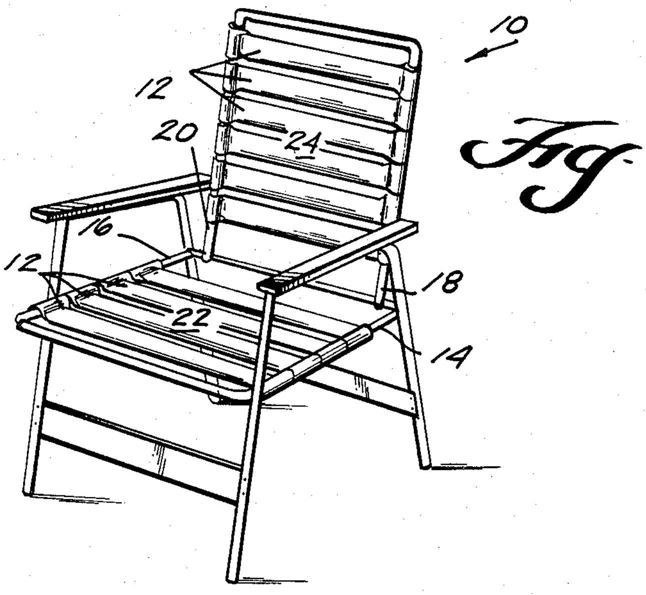
Fig. 1
Fig. 3
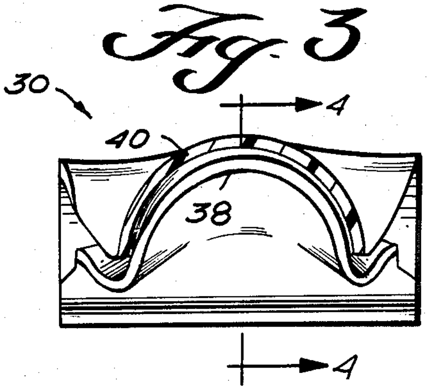
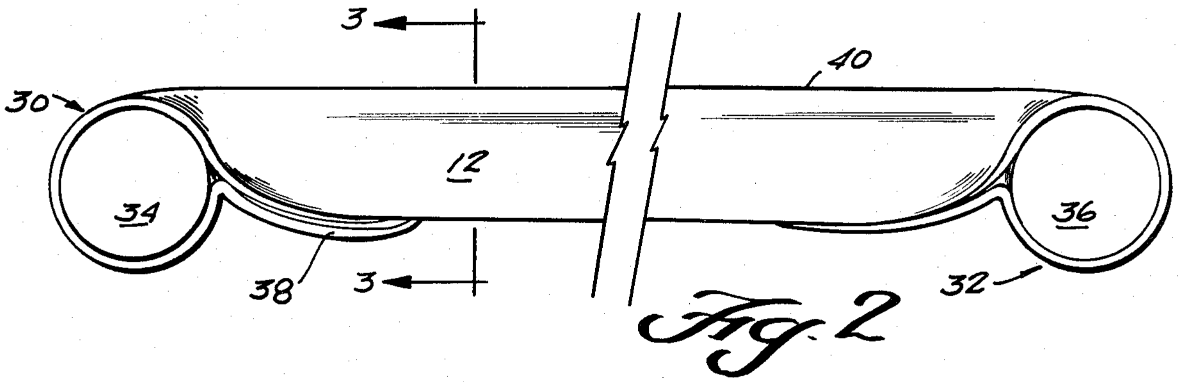
Fig. 2
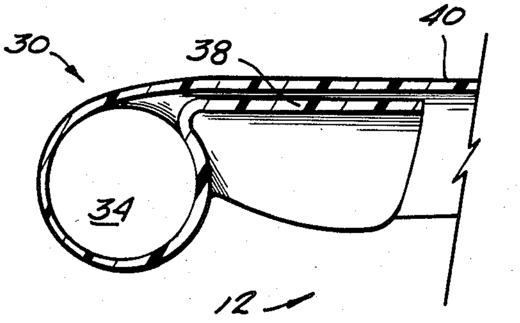
Fig. 4
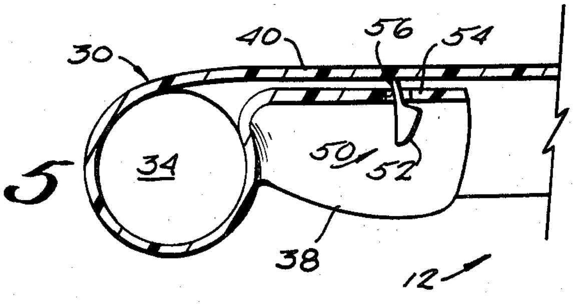
Fig. 5
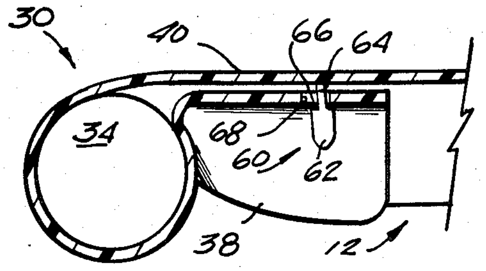
Fig. 6

Fig 7
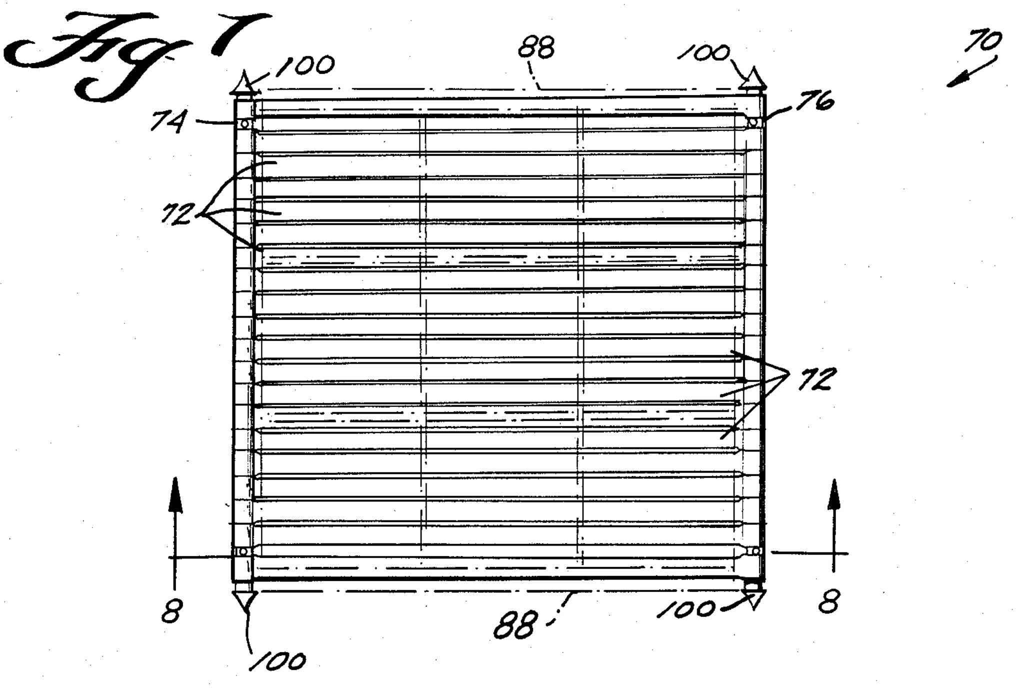
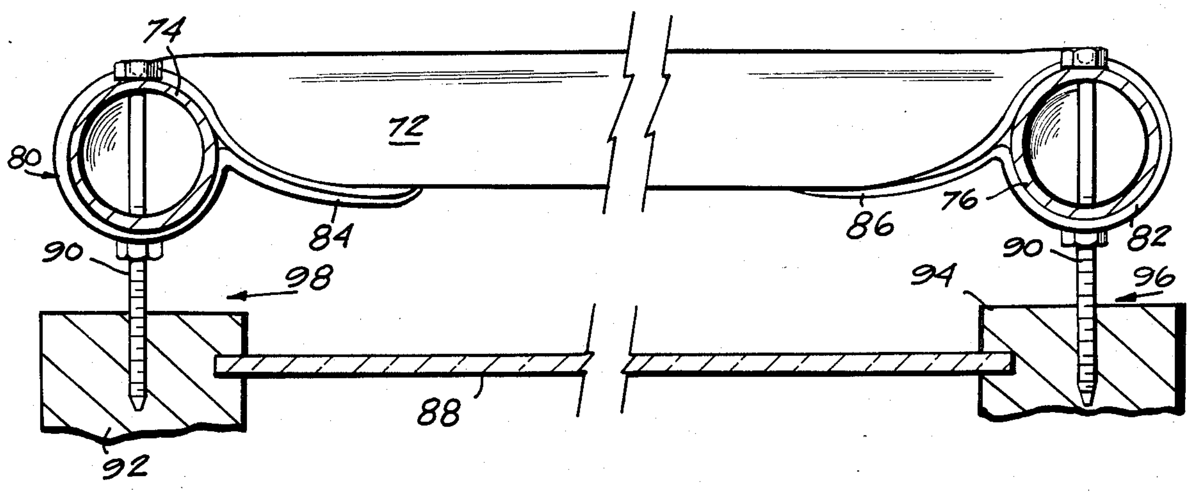
Fig. 8

METHOD OF REPLACING WORN AND/OR DAMAGED SURFACES

This is a division of application Ser. No. 352,102, filed Feb. 25, 1982, now U.S. Pat. No. 4,438,800 issued 3-27-84.

BACKGROUND AND SUMMARY OF THE INVENTION

The present invention generally relates to a novel slat for defining a surface when a plurality of such slats are positioned between separated opposing, generally parallel frame or support members. In its broadest aspect, the novel slat according to the present invention can be utilized in pluralities between such opposing frame or support members to define a variety of functional and/or decorative surfaces.

In one embodiment, the present invention may be advantageously utilized with a type of furniture generally referred to as lawn furniture which includes, among other items, chairs, chaise lounges, or the like. Although lawn furniture is predominantely utilized in an exterior environment such as patios, swimming pool decks, or the like, many lawn furniture designs are readily compatible with certain interior decor, especially where a casual ambiance is desired.

Lawn furniture construction typically comprises opposing frame members between which a plurality of slats or webbing can be disposed to define the load bearing surfaces of the furniture. The present invention, therefore, is more specifically related to a novel slat or webbing adapted for being positioned between opposing frame members of lawn furniture so that existing deteriorated or damaged slats can be quickly and economically replaced.

While the present invention is particularly adapted to replacing deteriorated lawn furniture slats, the novel slat of the present invention may also be supplied by the manufacturer of such lawn furniture in the first instance so that subsequent replacement thereof can be quickly and easily effected. The slat of the present invention is durable and lightweight to aid in the transportability of furniture with which it is associated. Moreover, the novel slat enables persons to replace existing slats without the need for special training or professional assistance.

Lawn furniture utilizing a plurality of slats or the like to define the furniture's load-bearing surfaces is not new. Indeed, the art is replete with various contrivances for providing seat and back surfaces for lawn furniture or the like as evidenced by U.S. Pat. Nos. 4,119,286; 3,737,926; 3,565,487; 3,512,832; 3,054,643; and 3,205,008. While the prior art is concerned with providing load-bearing surfaces for lawn furniture or the like, most of the prior art slats are rather complicated so that the average person could not easily replace them. Thus, the prior art is directed generally to furniture manufacturers, professional furniture repairmen, or the like and not to the average consumer.

However, according to the present invention there is provided a novel slat which can be adapted to cooperate with virtually all types of conventional lawn furniture frames and, additionally, does not require special mechanisms or training in order to be effectively and advantageously utilized. Thus, the present invention is particularly suited for the average consumer to use in order that they may protect and repair personal items of furniture.

In another embodiment, the slat of the present invention can be utilized in pluralities to protect certain vulnerable areas of a building structure, such as windows, doors or the like, from breakage and/or damage due to potentially damaging flying debris normally associated with high-velocity winds.

High-velocity winds normally encountered during severe meteorological disturbances, such as, hurricanes, are potentially destructive to static building structures. Wind velocities of between 70 to 100 m.p.h. or more are not uncommon during the brunt of the hurricane's assault. Unlike its meteorological cousin, the tornado, a hurricane's behavior can be reasonably predicted by meteorologists thereby providing as much as several hours advance warning to the residents of the endangered areas.

Often, when a hurricane track has been studied and coastal areas most likely to be affected have been warned, residents of such areas normally take immediate precautionary action to protect their homes or businesses. The conventional method of protecting windows, doors or the like from the damaging debris hurtled against the building by the hurricane's high-velocity winds is to nail sheets of plywood over the windows and/or doors. When the hurricane's threat has subsided, the plywood is removed and either scrapped or stored by the building owner. Of course, scrapping plywood is a wasteful alternative. If the building owner decides to store the plywood for future use, the plywood necessarily occupies valuable storage space which could be utilized for other purposes. The plywood protection method also has the disadvantage of being extremely cumbersome, often requiring the assistance of additional persons to properly install it over the windows and/or doors of the building structure.

According to the present invention, however, quick and efficient means are provided for protecting vulnerable areas of a building structure from the deleterious effects of high-velocity winds. In this embodiment, support members are attachably arranged on both sides of a window, for example, and the novel slats are positioned therebetween bridging the support members. When a sufficient number of slats have been thus positioned, a protecting surface has been formed over the window so that flying debris will impinge upon the slats rather than damaging the window. When the need for the protecting surface has passed, the slats need only be disassembled from the support members and conveniently stored in a compact manner for future use.

The slat according to the present invention generally comprises an elongated surface defining portion having opposing ends which, when properly positioned between opposing frame or support members will define the desired surface (e.g. a weight-bearing surface in the case of lawn furniture or a protecting surface in the case of building protection). Preferably, each end of the slat includes an attachment member which defines a substantially closed cavity for receiving a portion of the frame or support member therein.

The novel slat of the present invention is preferably constructed of a material which is substantially rigid, yet is substantially resilient so that an inherent biasing force is provided on each attachment end. The material of construction biases the attachment member to a substantially closed position, yet will allow yieldable separation, and thus, access to the cavity upon the application of a force in a direction generally opposing the bias force. A particularly preferred material of construction for the slat according to the present invention is polyvinylchloride (PVC).

By utilizing PVC, the slats of the present invention can be quickly and easily manufactured from conventional conduits of PVC by cutting such conduits longitudinally into halves, and subsequently forming the attachment ends on each of such halves thereby forming two slats according to the present invention. Thus, a wide variety of slats can be quickly and efficiently manufactured to accommodate virtually all sizes of support or frame members. Since PVC is a material which can be shaped upon the application of heat, shaping the attachment ends to form the substantially closed cavity can be quickly effected thereby promoting mass production of the novel slats. Additionally, upon cooling, the PVC material will, once again, become substantially rigid thereby providing the bias force necessary to maintain the attachment end in its normal substantially closed position.

BRIEF DESCRIPTION OF THE DRAWINGS

Preferred exemplary embodiments of the present invention will be discussed below with reference to the accompanying drawings wherein:

FIG. 1 is a perspective view of an article of lawn furniture showing the novel slats of the present invention properly positioned between opposing frame members thereof;

FIG. 2 is a front elevational view of an embodiment of the slat according to the present invention;

FIG. 3 is a cross-sectional view taken along line 3—3 as shown in FIG. 2;

FIG. 4 is a longitudinal cross-sectional view taken along line 4—4 as shown in FIG. 3;

FIG. 5 is a partial end sectional view depicting one embodiment of a tab restraining member according to the present invention;

FIG. 6 is a partial end sectional view depicting another embodiment of a tab restraining member according to the present invention;

FIG. 7 is a front elevational view of another embodiment of the present invention which utilizes a plurality of novel slats to define a surface for protecting vulnerable areas of a building structure; and FIG. 8 is a detailed cross-sectional view taken along line 8—8 as shown in FIG. 7.

DETAILED DESCRIPTION OF THE PREFERRED EXEMPLARY EMBODIMENTS ACCORDING TO THE PRESENT INVENTION

The present invention is particularly suited for efficiently and economically replacing worn and/or damaged slats in an article of lawn furniture. As seen by referring to FIG. 1, an article of lawn furniture 10, for example, a chair, can be provided with a plurality of novel slats 12 according to the present invention disposed between opposing frame members 14, 16, 18 and 20, respectively. Frame member pairs 14, 16, and 18, 20 are arranged generally parallel with respect to one another so that seat and back load-bearing surfaces 22, 24, respectively, are thus formed by properly positioning the plurality of slats 12 therebetween.

In the interest of lightweight and transportability, most conventional articles of lawn furniture comprise a frame manufactured from a portable and lightweight material, such as, aluminum, plastic or the like. Such lightweight construction of lawn funiture has the inherent advantage of being easily transportable yet sufficiently durable to withstand various weather conditions.

Referring to FIG. 2, a preferred embodiment of a slat 12 according to the present invention is depicted wherein the elongated slat 12 comprises two generally opposing attachment end portions 30, 32, respectively. Each end portion 30, 32 defines a substantially closed cavity 34, 36, respectively, for cooperation with a portion of the furniture frame member (not shown in FIG. 2 for clarity).

As shown more clearly in FIGS. 3 and 4, attachment end 34 preferably terminates in a tab member 38 which is disposed under the load-bearing arcuate portion 40 of slat 12 and extends longitudinally thereunder for a predetermined distance. Therefore, cavity 34 is substantially closed in a normal condition and is disposed substantially perpendicular to the longitudinal elongated axis of slat 12. It should be noted that in partial FIGS. 3 through 6, only end portion 30 is shown for clarity. However, it should be appreciated that the discussion relating to end portion 30 is similarly applicable to end portion 32.

When it is desired to gain access to cavity 34 for replacement or removal of slat 12, tab member 38 need only be resiliently separated from the underside of the load-bearing portion 40. In such a manner, access to cavity 34 is gained due to the separation of the tab member 38 from the underside of the load-bearing portion 40 so that the frame member (not shown) of the article of furniture can be properly positioned therein.

In order to obtain such resilient separation, at least the attachment ends 30, 32 of slat 12 are constructed of a substantially rigid, yet resilient material, such as a thermoplastic material (e.g. polyvinylchloride), relatively thin metal, or the like.

As shown in FIG. 3, load-bearing portion 40 is arcuate in latitudinal cross-section, the apex of which is adapted for receiving loads placed thereon. In such a manner, slat 12 is comfortable to a person seated in an article of furniture which utilizes the present invention, while being structurally durable due to the force distribution of the arcuate cross-section. However, while an arcuate cross-section is preferable the present invention may advantageously utilize other structural shapes as required.

Although the inherent resilient biasing of tab member 38 to retain it in normal close proximity to the underside of surface 40 is generally sufficient for most purposes, often it is required that means be provided which securely lock tab member 38. According to the present invention, such means are provided by a nib and aperture arrangement whereby a nib is dependently formed on the underside of the supporting surface 40 and an aperture is defined in the associated tab member.

As more clearly seen in FIG. 5, one embodiment of such a nib/aperture arrangement is shown wherein nib 50 comprises a head 52 which defines a substantially flat surface 54 generally parallel to the supporting surface 40 of slat 12. Head 52 of nib 50 can be inserted through aperture 56 and pushed forward once it has cleared the cross-sectional thickness of tab 38 so that the surface 54 cooperates with the underside of tab member 38. Thus, when the nib/aperture arrangement is in a "locked" position, an attempt to resiliently urge the tab 38 away from the underside of load bearing surface 40 of slat 12 will fail due to the locking engagement of nib 50 and aperture 56. To removably disengage tab 38 from slat 12, one need only push head 52 rearwardly and, thereafter, concurrently urge tab 38 away from the bottom side of slat 12 so that head 52 will once again press freely through aperture 56.

Another embodiment of a nib/aperture locking arrangement according to the present invention is depicted in FIG. 6 wherein nib 60 is similarly dependently disposed from the underside of slat 12. Nib 60 comprises a head 62 and a stem 64 connecting the head 62 to the underside of slat 12. Head 62 is generally symmetrical about stem 64 and defines a surface 66 therearound.

The widest cross-sectional dimension of head 62 preferably occurs at surface 66. An aperture 68 is similarly provided in tab 38, which aperture 68 has slightly less diameter than the cross-sectional dimension at surface 66. Thus, when nib 60 is in a "locked" position as shown in FIG. 6, tab 38 will be securely yet removably locked in close proximity to the underside of the load bearing surface 40 of slat 12. However, when it is desired to resiliently separate tab 38 from slat 12, one need only exert a sufficient separating force on tab 38 to cause head 62 of nib 60 to be resiliently conformed to the slightly lesser diameter of aperture 68. Due to the material of construction of nib 60 and particularly, the head 62 thereof, the greatest dimension of nib 60 at surface 66 will be resiliently conformed to the slightly lesser diameter of aperture 68 upon the application of sufficient force to tab 38. When tab 38 is in an "open" position such that access to cavity 34 may be obtained, head 62 of nib 60 will once again expand to its normal dimensional shape. Therefore, when it is desired to "lock" the tab 38, one need only apply sufficient force to tab 38 so that head 62 will penetrate aperture 68 and the widest dimension thereof will conform generally to the diameter of aperture 68.

Another embodiment of the present invention is depicted in FIGS. 7 and 8 wherein a plurality of novel slats (e.g., see FIG. 2) are utilized to define a protecting surface. For the embodiment shown in FIGS. 7 and 8, the term "hurricane shutter" will be used for convenience and is not limiting thereto.

The hurricane shutter 70 in FIG. 7 generally comprises a plurality of slats 72 attachably connected between support members 74, 76, respectively. Slats 72 of hurricane shutter 70 are similar to the slat depicted in FIG. 2. Referring to FIG. 8, it can be seen that representative slat 72 similarly includes opposing attachment ends 80, 82 each of which defines a substantially closed cavity in which support members 74, 76 can be respectively accepted. Attachment ends 80, 82 preferably terminating in tab members 84, 86, respectively. When access to the cavity defined by each attachment end 80, 82 is desired for attachment or removal from support members 74, 76, tab members 84, 86 need only be resiliently urged away from the bottom surface of slat 72. In such a manner, slat 72 may be efficiently installed and/or removed from support members 74, 76.

In order to obtain resilient separation, at least attachment ends 80, 82 of slat 72 are constructed of a substantially rigid, yet resilient material, such as a thermoplastic material (e.g. polyvinylchloride), relatively thin metal or the like.

Referring again to FIG. 7, it becomes apparent that when a plurality of slats 72 are properly positioned between support members 74, 76, a protective shield may be established over certain vulnerable areas of a building structure, such as, a window (shown in phantom line at 88 in FIG. 7).

Support members 74, 76 are preferably elongated conduits or rods constructed of lightweight durable material, such as, thermoplastic material, aluminum or the like. Support members 74, 76 are preferably attached adjacent the sides of the building structure area to be protected by any suitable means, for example, screws 90. Screws 90 may thus be utilized to securely anchor the support members 74, 76 to the building structure (for example, to window frames 92, 94 shown in FIG. 8). Support members 74, 76 should be anchored away from the building structure to define suitable spaces 96, 98 through which two members 84, 86, respectively, can pass during installation or disassembly of hurricane shutter 70.

In one aspect of hurricane shutter 70, support members 74, 76 can be permanently attached to the building structure. Thus, in this aspect, only slats 72 are installed and removed as the need arises. Slats 72 are sequentially installed so that as each is positioned between support members 74, 76, all previously installed slats are slidingly pushed upwards to make room for the next slat to be installed. To remove slats 72, a reverse procedure is all that is needed. Thus, gravitational force will encourage all slats to move downward as successive slats are removed from the bottom of hurricane shutter 70. In such a manner, the necessity for a ladder to install and remove slats 72 is obviated.

It is also conceivable that removable attachment means can be provided to removably attach support members 74, 76 to the building structure. Thus, the hurricane shutter 70 can be assembled on the ground and installed as a unit over windows, doors, or the like. Alternatively, support members 74, 76 may first be attached to the building structure and slats 72 positioned therebetween in a manner similar to that described above.

In either aspect, support members 74, 76 may be provided with caps 100 having any desired shape and/or design to aesthetically enhance the appearance of hurricane shutter 70. Caps 100 are particularly useful when the building owner decides to maintain support members 74, 76 attached to the building structure during periods when slats 72 are not utilized as protection.

While the present invention has been herein described in what is presently conceived to be the most preferred embodiments thereof, it will be appreciated that those in the art may make modifications thereto upon a detailed reading of this disclosure, which modifications should be accorded the broadest interpretation of the appended claims so as to encompass all equivalent assemblies, devices, and/or articles.

What is claimed is:

1. A method for replacing at least a portion of a worn and/or damaged surface on an article of furniture having a frame which includes at least a pair of opposing generally parallel spaced frame members, said surface adapted to supporting at least a portion of a person's weight thereon, said method comprising the steps of:

(a) selecting a slat comprising support means for supporting a load placed thereon having generally opposing ends, each of said ends including attachment means defining a closed cavity for receiving a portion of one of said frame members, and biasing means for providing a bias force thereby biasing said attachment means in a normal substantially closed position and for allowing access to said cavity upon application of a force in a direction generally opposing the bias force;

(b) applying a force to said attachment means at one end of said slat in a direction generally opposing the bias force of said biasing means thereby opening and providing access to the cavity;

(c) then positioning the opened one end around a portion of a predetermined one of said frame members so that said attachment means substantially surrounds said one frame member thereby allowing said one frame member to be accepted by said cavity;

(d) then releasing the force applied according to step (b) so that said attachment means returns to a normal substantially closed position thereby securing said one end in position; and repeating steps (b)–(d) utilizing the other end of said ends and the other one of said opposing frame members.

2. A method as in claim 1 further comprising the step of:

(e) repeating steps (a)–(d) until a predetermined plurality of slats are positioned between said opposing frame members so that at least a portion of one of said supporting surfaces is provided.

3. A method as in claim 1 further comprising the step of:

(e) removeably retaining the attachment means in the normal closed position.

4. A method of replacing at least a portion of a worn and/or damaged surface bridging a pair of opposing separated surface support members said method comprising the steps of:

(a) selecting a surface-defining member of the type including opposing ends each having an attachment means defining a closed cavity for receiving a portion of one of said support members therein, and biasing means for providing a bias force to bias said attachment means into a normal substantially closed position and for allowing access to said cavity upon application of a force in a direction generally opposing said bias force;

(b) applying a force to the attachment means at one end of said surface-defining member in a direction generally opposing the bias force of the biasing means to open the attachment means thereby providing access to the cavity;

(c) then positioning the one end having its respective attachment means opened according to step (b) so that a predetermined one of the pair of surface support members is accepted into the cavity;

(d) then releasing the force applied according to step (b) to permit the attachment means to assume the normal closed position around said one of the pair of surface support members; and repeating steps (b)–(d) utilizing the other one of said ends and the other one of said pair of surface support members.

5. A method as in claim 4 further comprising the step of:

(e) removeably retaining the attachment means in the normal substantially closed position.

* * * * *